April 12, 1966 WAY DONG WOO 3,246,292

ECHO CHECK WITH TIME-PHASED INPUT DATA SAMPLING MEANS

Filed Oct. 4, 1961

2 Sheets-Sheet 1

INVENTOR
WAY DONG WOO

BY Fred Jacob

ATTORNEY

INVENTOR.
WAY DONG WOO
BY Fred Jacob
ATTORNEY

United States Patent Office 3,246,292
Patented Apr. 12, 1966

3,246,292

ECHO CHECK WITH TIME-PHASED INPUT DATA SAMPLING MEANS

Way Dong Woo, Newton Center, Mass., assignor to Honeywell Inc., a corporation of Delaware Filed Oct. 4, 1961, Ser. No. 142,801
8 Claims. (Cl. 340—146.1)

Figure 1:
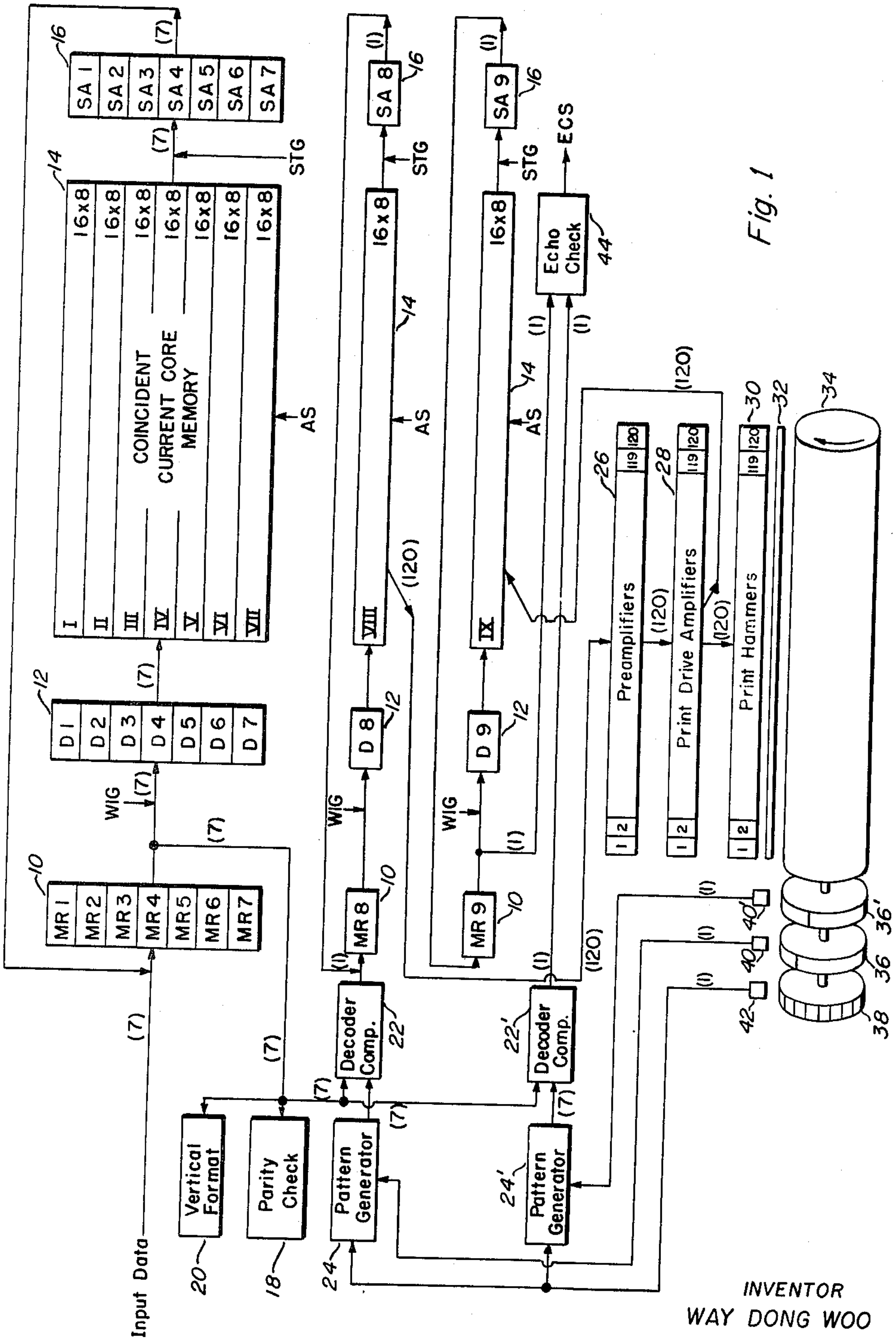

The present invention relates in general to new and improved control apparatus and in particular to control apparatus for verifying the occurrence of certain physical events selected from a sequence of possible physical events in accordance with input data representative thereof.

In the subsequent discussion reference will be had to a specific example of the invention, as used in connection with a computing system wherein the printing of output data is verified. The data characters which constitute the output data are selected from a recurring sequence of characters in accordance with encoded information received at the input of the control apparatus, for example, from the central processor of the computing system. It will be obvious, however, that the invention is not confined to the particular computer output equipment described below, but may find application wherever there is a transfer of data characters to a more or less permanent storage medium such as occurs in printing, card punching, magnetic recording or any other of numerous ways of storing data which will readily suggest themselves to those skilled in the art. Indeed, the applicability of the invention transcends its use with data transfer equipment and extends to the verification of the occurrence of any physical event in accordance with input data received.

A scheme for checking the transfer of data characters to a storage medium which are selected from a recurring sequence of data characters in accordance with digitally encoded input data is disclosed in a copending application by Charles J. Barbagallo and Richard D. Pasciuto, Serial Number 113,351, filed May 29, 1961 and assigned to the assignee of the present invention. In the above-mentioned patent application it is pointed out that data transfer operations, when they occur in association with the operation of a high-speed computing system, must generally be carried out rapidly. Accordingly, the possibility of errors due to a failure of the mechanical equipment or due to faulty operation of the circuitry is greatly increased. Parity checking schemes, which rely on the proper summation of the various digital codes with a parity check bit that is carried in the data stream, have a very high probability of detecting existing errors in a given data code. Such a check, however, has only limited utility when output equipment of the type mentioned above is involved. This is due to the fact that in the process of selectively storing data characters in an output storage medium, the data code must ultimately be translated into energizing signals for the equipment which carries out the actual transfer of the corresponding data character to the medium. For example, if a hammer printing operation is considered, hammer energizing signals must be produced which are not readily susceptible of parity checking in the same way as their originating data codes. A gap may thus exist in the verification of a sequence of operations which occur between the time the data appears at the output of the computer and the time it is printed. Unless some checking scheme is provided, substantial errors could thus go undetected until found by the ultimate user of the printed product.

The control apparatus disclosed in the above-mentioned copending application employs a checking scheme whereby a pair of substantially identical decoder comparators simultaneously compare the output of a single pattern generator with the input data. True comparisons between the pattern generator codes and the input data are stored in decoded form in a buffer and in a special core plane of the memory respectively. The buffer contents are employed to print a given data character simultaneously in all the spaces of a given line which correspond to the true comparisons stored in the buffer for the given data character under consideration. Concurrently, an echo signal is derived for each character printed. While this process goes on, the contents of the first special core plane are transferred to a second special core plane in order to empty the first core plane for the receipt of true comparison data related to the subsequent data character compared. The contents of the second special core plane are compared against the echoes derived in connection with the printing of the first data character, a lack of identity being recognized as an error.

Although a high degree of reliability is attained by the checking technique discussed above, verification is limited inasmuch as it is only applicable to discrete portions of the printing process. In the absence of an over-all check, errors are still possible. For example, an error occurring between the points where the input data is parity checked and where it is applied to the decoder comparators may escape detection. Thus, if noise on the line following the parity check were to add a single binary digit to the output signal of the memory which is being compared against the output of the pattern generator in the aforesaid pair of decoder comparators, a true comparison for the particular data character under consideration might be indicated for an incorrect core memory location. The printing of this character in the incorrect space would produce an echo signal that would show no errors when compared in the echo checking unit. Alternatively, the noise condition mentioned above could result in a failure to obtain a true comparison where one is indicated. Again, the echo check might fail to detect this condition.

Accordingly, it is the primary object of this invention to provide control apparatus which overcomes the foregoing disadvantages.

It is another object of this invention to provide control apparatus for verifying the occurrence of desired physical events by checking the echoes due to each event against independently derived checking codes.

It is a further object of this invention to provide apparatus for verifying the occurrence of physical events in accordance with encoded input data by employing time-phased samplings of the data to originate independent operations whose results are ultimately checked against each other.

It is an additional object of this invention to provide apparatus for verifying the occurrence of a desired operation in accordance with input data received by sampling the data at different time intervals and comparing the end results of the independent operating sequences resulting from said samplings, one of which includes said desired operations.

It is still another object of this invention to provide control apparatus for verifying the printing of data characters selected from a recurring sequence of possible characters in accordance with input data character codes, by making time-phased comparisons of said data for each character to originate independent operating sequences including the printing of the compared character and comparing the results of said operating sequences.

In brief, the invention which forms the subject matter of this application comprises storage means for receiving input data units which are respectively representative of discrete operations. Independent means are provided for sampling the input data at different time intervals for the presence of a chosen data unit while further means are responsive to respective ones of the aforesaid samplings for carrying out independent sequences of operations. One of these operational sequences includes the discrete operation which corresponds to the chosen data unit for which sampling occurs. Means are further provided for comparing the end results of the independent operational sequences which correspond to each chosen data unit.

Figure 2:
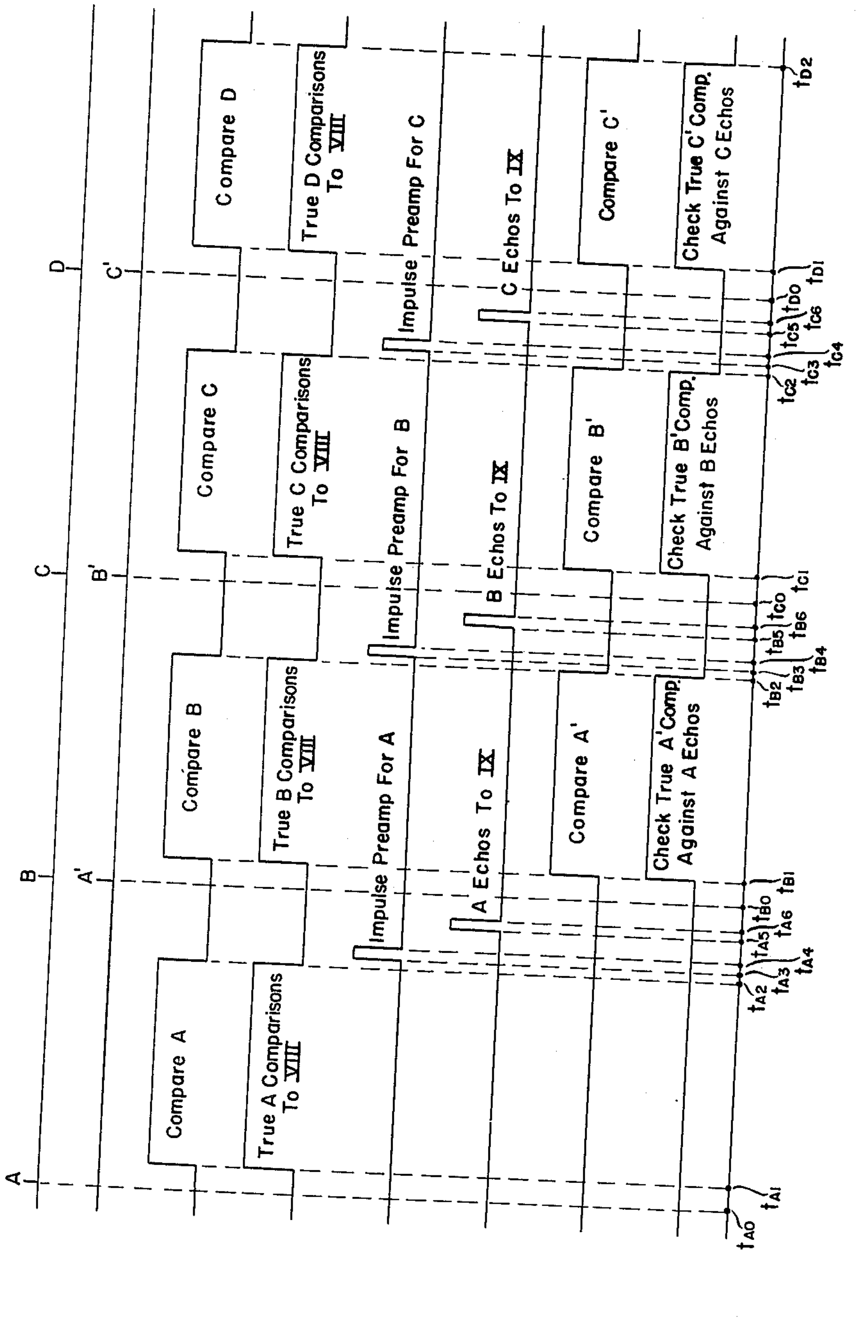

The various novel features which characterize the invention are pointed out with particularity in the claims annexed to and forming a part of this specification. For a better understanding of the invention, its advantages and specific objects thereof, reference should be had to the following detailed description and the accompanying drawings in which:

FIGURE 1 illustrates a preferred embodiment of the invention as applied to a high-speed printer capable of printing one line at a time; and FIGURE 2 shows a timing diagram of certain key functions which occur in the operation of the apparatus of FIGURE 1.

With reference now to the drawings, FIGURE 1 shows the input data as arriving on seven channels, as indicated by the number (7) above the schematic single-line representation of the input. Without so limiting the invention, the data organization adopted in the preferred embodiment described herein calls for data words consisting of eight data characters, each data character being represented by six binary digits. Six parity check digits are associated with each data word so that 54 bits fully represents one data word. Sixteen data words constitute a data record, of which the first word is devoted to vertical formating data and the remaining 15 words contain the information relative to the output data that is to be printed.

The input data is applied to the memory registers MR1–MR7 of a memory register unit 10. The latter comprises nine substantially identical gate buffer amplifiers MR1–MR9, each capable of storing data by recirculation. As indicated by the parenthetical number designation, the output of MR1–MR7 is coupled to seven inhibit drivers D1–D7 of an inhibit driver unit 12 which contains nine substantially identical drivers D1–D9. Seven channels of the inhibit driver unit are coupled to the input of a coincident current core memory 14 which comprises nine substantially identical core planes I–IX. For the sake of the discussion herein, each of the core planes consists of a 16-by-8 core matrix. A memory location is defined by the corresponding cores of all nine or less than all nine core planes. The memory output is coupled to the sense amplifiers SA1–SA7 of a sense amplifier unit 16, which consists of nine substantially identical amplifiers SA1–SA9. A 7-channel output of the unit 16 is coupled back to the input of the memory registers MR1–MR7. The 7-channel output of the memory register unit 10 is further coupled to a parity check unit 18, as well as to a vertical formating unit 20. In addition, it is connected to the input of a pair of decoders 22 and 22′, each of which receives an additional 7-channel input from a pair of pattern generators 24 and 24′.

The single channel output of the decoder comparator 22 is coupled to the memory register MR8 of the unit 10, whose output in turn is connected to the inhibit driver D8 of the unit 12. The core plane VIII of the memory 14 receives an input from the inhibit driver D8, its output, in turn, being connected to the sense amplifier SA8 of the unit 16. The output of the latter is coupled back to the input of the memory register MR8. A 120-channel output of the core plane VIII is connected to the input of a preamplifier unit 26. In a preferred embodiment of the invention wherein it is desired to print 120 data characters in a single print line, the unit 26 consists of 120 substantially identical preamplifiers, as shown. The output of the preamplifier unit 26 is coupled to a print drive amplifier unit 28 which similarly consists of 120 substantially identical amplifiers. The output of the unit 28 is coupled to a hammer drive unit 30 which comprises 120 hammers confronting a paper web 32 that is positioned to move in a direction normal to the plane of the drawing between the hammers 30 and a print roll 34.

In the preferred embodiment of the invention, the data organization calls for 56 different data characters which are represented in signal form by 56 separate digital codes. The print roll 34 contains 56 different rows of type fonts spaced about its periphery, each row containing 120 type fonts of the same data character. The print roll is adapted to rotate at a uniform speed in the direction indicted by the arrow. A pair of index discs 36 and 36′, as well as a character disc 38 are rigidly affixed to the print roll 34 by means of a common shaft so as to rotate with the print roll. The character disc 38 has 56 markers spaced about its periphery which correspond to the 56 rows of type fonts on the print roll 34. Each of the index discs 36 and 36′ has one marker on its periphery, the marker on the disc 36 leading the marker on the disc 36′ in the indicated direction of print roll rotation. A pair of pickups 40 and 40′ are positioned in close proximity to the discs 30 and 36′ respectively and are coupled to the pattern generators 24 and 24′ to which they supply pulses when the corresponding index markers rotate under the pickups. A third pickup 42 which is positioned opposite the character disc 38, is coupled to both pattern generators 24 and 24′.

A 120-channel output from the print drive amplifier unit 28 is coupled directly to the cores of the core plane IX. The latter has a sense amplifier SA9 coupled to its output whose output in turn is connected to the input of a memory register MR9. An inhibit driver D9 is coupled to the output of MR9 and is connected to the input of the core plane IX. A further output from the memory register MR9 is connected to an echo check unit 44 which receives an additional input from the decoder comparator 22′. The echo check output signal is labeled ECS.

The operation of the preferred embodiment of the invention which is illustrated in FIGURE 1 of the drawings, will be explained with the aid of FIGURE 2. A convenient time unit of the operation is the so-called memory cycle. A single location of the core memory is addressed by the address selection function AS for the duration of each memory cycle, the latter being employed to read input information into the addressed memory location, to read data out from the latter, or to destroy the contents of the addressed location by reading out its contents with the sense amplifiers disabled by a strobe gating signal STG.

The operation of the apparatus is divided into a loading phase during which input data is loaded into the core memory 14, a vertical formating phase during which the paper web 32 is positioned to the line on which printing is to take place next, and a print and comparison phase. The first two phases of the operation are described in the above-mentioned copending application, Serial Number 113,351. The invention herein, as applied to the illustrated embodiment, is directed to the verification of the operation carried out during the print and comparison phase in accordance with the input data received.

The input data arrives on seven channels at the memory registers MR1 through MR7. From the memory registers the input data is transferred under the control of the write inhibit gating signal WIG to the core memory 14 by way of the inhibit drivers D1–D7. Loading into the proper location of the memory occurs under the control of the address selection function AS which is simultaneously applied. Formating data is stored in the memory locations 0–7, while the actual output data is stored in the locations 8–127. The data in the respective memory locations is recirculated as AS addresses the sequence of 128 locations. This recirculation occurs periodically by way of the sense amplifier unit 16, the memory register unit 10 and the inhibit driver unit 12. A different 7-bit frame is thus recirculated during each memory cycle and becomes available at the output of the memory register 10. Every time a frame is read out of the memory registers MR1–MR7, a parity check is performed by the parity checking unit 18.

Let it be assumed that the next row of type fonts on the print roll 34 to rotate into printing position contains the character A. The pattern generator 24, having been previously reset by an index pulse derived from the pickup 40, will provide the digital code for the letter A at its output when it is pulsed by an appropriate character pulse derived from the pickup 42 at time $f_{A0}$. The code for the letter A is thus applied to the comparator 22 for a time period determined by the spacing of the index markers on the character disc 38, which period is sufficient to examine the memory locations 8–128 for the presence of the character A.

Thus, as the contents of the memory locations 8–127 are read out from the memory register unit 10, they are examined for the presence of A's between $t_{A1}$ and $t_{A2}$. If a true comparison is found to exist, a pulse corresponding to a single binary digit is fed to MR8 and is further transferred to the core plane VIII by way of the inhibit driver D8. The binary digit which is thus representative of the true comparison is stored in that location of the core plane VIII which corresponds to the core memory location whose contents, when compared with the A code of the pattern generator 24, gave rise to the true comparison. This is assured by the address selection function AS which simultaneously addresses all of the core planes I–IX. It will be noted that the comparison of the A code with the contents of the binary locations 8–127 occurs between the times $t_{A1}$ and $t_{A2}$, simultaneously with the storage of any resultant true comparison pulses in the core plane VIII.

After the core memory location 127 has been examined, the data in the core plane VIII is simultaneously transferred out by way of 120 channels to impulse the preamplifiers 26 betwen times $t_{A3}$ and $t_{A4}$. Corresponding signals are applied to the print drive unit 28, which in turn energizes the corresponding print hammers as the appropriate character line of the print roll 34 rotates into printing position. As a result, the character A is printed in those spaces of the 120-space print line which correspond to the memory locations in which the A character codes are stored.

Whenever the output of a print drive amplifier becomes active, a single pulse echo signal is derived. These echo signals are transferred by way of 120 channels to the cores of the core planes IX where they are stored in the corresponding locations, as determined by the address selection function AS. Thus, a single bit is stored in the core plane IX between $t_{A5}$ and $t_{A6}$ for each echo, i.e. for each print drive amplifier which was energized to effect the printing of the character A in the corresponding space of the print line. The data in the core plane IX is recirculated via sense amplifier SA9, memory register MR9 and inhibit driver D9. Since this recirculation occurs under the control of the address selection function, the contents of the respective locations of the core plane IX become available at the output of MR9 at memory cycle intervals.

At time $t_{B0}$, the next marker on the character disc 38 causes the pickup 42 to apply a pulse to the pattern generator 24, which responds by applying the code for the next character, e.g. for the character B, to the input of the comparator 22. The process described above for the character A is now repeated for the character B.

In the preferred embodiment of the invention which is illustrated in FIGURE 1, the marker on the index disc 36′ is displaced by one character space from the marker on the index disc 36. Accordingly, the pickup 40′ applies an index pulse to the pattern generator 24′ that is out of phase with the index pulse provided by the pickup 40, by an interval corresponding to 1/56 of the rotation period of the print roll 34. This time interval corresponds to the generation of the code of a particular character. Accordingly, the pattern generator 24′ is reset one character interval after the resetting of the pattern generator 24 occurs so that its ouptut always lags the output of the pattern generator 24 by one character code. Therefore, at time $t_{B0}$ when the pattern generator 24 is pulsed to provide the B character code at its output, the pattern generator 24′ will be pulsed to provide the A character code at its output.

During the period $t_{B1}$ to $t_{B2}$ when the comparator 22 compares the contents of the core memory for the presence of the character B, the comparator 22′ which receives the same input as the comparator 22, samples the core memory contents for the presence of the character A. The latter comparison which takes place between $t_{B1}$ and $t_{B2}$ is indicated by the wave form labeled Compare A′ in FIGURE 2. As in the case of the comparator 22, each true comparison for the character A which is found by the comparator 22′ results in a single pulse. This pulse is applied to the echo check unit 44. Simultaneously, the echo pulse stored in the corresponding location of the core plane IX is read out of the memory register MR9 and is applied to the echo check unit 44. There they are checked for identity between times $t_{B1}$ and $t_{B2}$. In the absence of identity, the signal ECS is generated and may be used to provide an echo check error indication and/or to stop the operation of the associated apparatus.

Following the echo checking procedure for the character A, the preamplifiers 26 are impulsed for the character B between $t_{B3}$ and $t_{B4}$ and the B echos are stored in the core plane IX between $t_{B5}$ and $t_{B6}$. It is assumed that the storage of new information in the core planes VIII and IX is preceded in each case by a timely clearing of these planes. As previously pointed out, this may be carried out by disabling the sense amplifiers SA8 and SA9 respectively by means of the strobe gating signal STG. Printing of the character B is effected in the prescribed spaces of the print line, as determined by the true comparisons stored in the core plane VIII.

The operation described above is repeated during each character interval until the print roll completes a rotation. At such time, the locations 8–127 of the core memory have been examined for the presence of all 56 data characters. A 57th character interval is required to complete the echo check of the 56th data character to be compared. Thereafter, the contents of the core memory locations 0–7 are read out to the vertical formating unit 20 which becomes operative to move the paper web 32 to the subsequent line on which printing is to take place. The loading of the memory with the subsequent data word in the manner described above, follows vertical formating.

Although a parity check is carried out whenever a data frame is transferred out of the memory registers MR1–MR7, it will be clear from the foregoing discussion that this check alone is inadequate to verify whether or not the printing of the desired character has taken place in accordance with the data stored in the respective locations of the core memory. The present invention supplements the parity check by verifying that proper printing has taken place. To this end, an echo pulse is derived for each print hammer energization and is checked against the true comparison pulses resulting from an independent examination of the core memory contents for the same character. In order to obtain over-all verification of the process, the latter examination is not only carried out independently, but also at a different time from the original examination that gave rise to the printing of the character.

It will be readily understood that the invention is not limited to a situation where the data characters recur periodically as in the case of the print roll 34, but is applicable to verify the transfer to an output data storage medium of any data character chosen from a data character sequence in accordance with the requirements dictated by the input data. Moreover, the invention is not confined to the transfer of data characters to a data storage medium but may be employed to verify the occurrence of any operation or physical event chosen from a sequence of such operations or events in accordance with the input data.

From the foregoing disclosure of the invention, it will be apparent that numerous modifications, changes and equivalents will now occur to those skilled in the art, all of which fall within the true spirit and scope contemplated by the invention.

What is claimed is:

1. Control apparatus for verifying the transfer to an output data storage medium of data characters selected from a recurring sequence of said characters in accordance with input data signal codes, comprising first storage means for storing each of said input data codes in a different one of a plurality of storage locations, first and second code generators synchronized to said recurring sequence for providing corresponding sequences of character signal codes, said first signal code sequence being phased to lead said second sequence by a time interval corresponding to one character signal code, first and second comparators for successively comparing each generated character signal code of said first and second sequences respectively with the contents of each location of said first storage means, each of said comparators being adapted to provide a special code signal for each true comparison, second storage means having a corresponding plurality of locations for storing each of said true comparison code signals derived from said first comparator, means for effecting the transfer of data characters to said medium simultaneously for all true comparison signals in said second storage means which correspond to a single character signal code, means for deriving an echo signal in said special code corresponding to each of said transfers, third storage means having a corresponding plurality of locations for storing each of said echoes, and means for comparing said true comparison code signals derived from said second comparator with the echo signal contents of each of said third storage locations for corresponding data characters.

2. The apparatus of claim 1 wherein said first storage means comprises a multi-plane coincident current core memory, and said second and third storage means each comprise a single core plane corresponding to one plane of said memory.

3. Control apparatus for verifying the occurrence of selected ones of a sequence of possible physical events in accordance with input data codes representative of respective ones of said events, comprising means in synchronism with said sequence of possible events to provide corresponding first and second sequences of said codes out of phase with each other, means for determining true comparisons between said input data and successively occurring codes of the leading one of said code sequences, means for simultaneously effecting the physical events corresponding to each individual code of said leading sequence for which true comparisons have been determined, means for deriving an echo for each of said physical events, means for determining true comparisons between successively occurring codes of the other one of said code sequences and said input data, and means for successively comparing said echoes and said last-recited true comparisons for each pair of corresponding sequence codes giving rise thereto.

4. Control apparatus for verifying the occurrence of selected ones of a sequence of possible physical events is accordance with input data codes representative of respective ones of said events, comprising means in synchronism with said sequence of possible events to provide corresponding first and second sequences of said codes out of phase with each other, means responsive to true comparisons of said input data with the codes from the leading one of said code sequences to effect the physical events corresponding to the latter codes, and means for checking echoes derived in response to the occurrence of said physical events against true compraisons of said input data with the codes from the other one of said code sequences corresponding to said latter codes of said leading sequence.

5. Control apparatus for verifying the occurrence of selected ones of a recurring sequence of possible physical events in accordance with input data code representative of respective ones of said events, comprising means in synchronism with said sequence of possible events to provide corresponding first and second sequences of said codes out of phase with each other, means for determining first true comparisons between said input data and the leading one of said code sequences, means for effecting the physical event corresponding to each code of said leading sequence for which a true comparison has been determined, means for deriving an echo for each of said physical events, means for determining true comparisons between said input data and the other one of said code sequences, and means for comparing said echoes and said last-recited true comparisons for corresponding codes of said sequences giving rise thereto.

6. Control apparatus for verifying the occurrence of selected one of a recurring sequence of possible physical events in accordance with input data codes representative of respective ones of said events, comprising means in synchronism with said sequence of possible events to provide corresponding first and second sequences of said codes out of phase with each other, first storage means for storing said input data codes in a plurality of locations, means for determining first true comparisons between each code of the leading one of said code sequences and the contents of each location of said first storage means, second storage means having a corresponding plurality of locations for storing representations of each of said first true comparisons, means for simultaneously effecting the physical events corresponding to each individual code of said leading sequence for which first true comparisons have been stored in said second storage means, means for deriving an echo for each of said physical events in a special code format, third storage means having a corresponding plurality of locations for storing said echoes in said special code format, means for determining second true comparisons between each code of the other one of said code sequences and the contents of each of said first storage locations, and means for comparing representations in said special code format of said second true comparisons with the echo contents of each of said third storage locations for each pair of corresponding codes of said sequences giving rise thereto.

7. The apparatus of claim 6 wherein said means for providing first and second code sequences comprise a pair of substantially identical code generators each synchronized to said sequence of possible physical events, one of said generators being phased to lead the other generator by a time interval corresponding to one code of said sequence.

8. In combiniation with a printer which is adapted to print selected data characters of a periodically recurring sequence of said characters, control apparatus for verifying the printing of data characters in accordance with input data in a first digital code representative of said characters comprising a multi-plane coincident current core memory, said memory including first and second special core planes, means for loading said input data into respective locations of said memory exclusive of said special planes, a first and a second pattern generator adapted to operate in synchronism with said sequentially recurring data characters for generating signals in said digital code representative thereof, said second pattern generator lagging said first pattern generator in time by one character of said sequence, first and second comparators adapted to compare the input data stored in said memory locations sequentially with the digital codes of said first and second pattern generators respectively, means for loading said first special plane with true comparisons encoded in a second digital code derived from said first comparator, means for simultaneously impulsing said printer with the contents of said first special memory plane corresponding to a single data character, means responsive to said printer impulsing to derive corresponding echoes encoded in said second digital code, means for loading said echoes into said second special memory plane, and means for comparing said echoes against true comparisons derived from said second comparator for the corresponding data character.

References Cited by the Examiner

UNITED STATES PATENTS

| | | | |
|---|---|---|---|
| 2,915,966 | 12/1959 | Jacoby | 101—93 |
| 2,954,731 | 10/1960 | Durand | 101—93 |
| 2,978,977 | 4/1961 | Eckert et al. | 340—146.1 X |
| 3,066,601 | 12/1962 | Eden. | |

ROBERT C. BAILEY, *Primary Examiner.*

MALCOLM A. MORRISON, *Examiner.*

J. S. IANDIORIO, M. P. ALLEN, *Assistant Examiners.*